(12) United States Patent
Yamaguchi

(10) Patent No.: US 12,468,421 B2
(45) Date of Patent: Nov. 11, 2025

(54) DETECTION DEVICE

(71) Applicant: Japan Display Inc., Tokyo (JP)

(72) Inventor: Hiroshi Yamaguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/911,564

(22) Filed: Oct. 10, 2024

(65) Prior Publication Data

US 2025/0123707 A1    Apr. 17, 2025

(51) Int. Cl.
*G06F 3/041*  (2006.01)
*G06F 3/044*  (2006.01)

(52) U.S. Cl.
CPC ........ *G06F 3/04166* (2019.05); *G06F 3/0443* (2019.05); *G06F 3/0446* (2019.05); *G06F 2203/04101* (2013.01); *G06F 2203/04107* (2013.01)

(58) Field of Classification Search
CPC .. G06F 3/04166; G06F 3/0443; G06F 3/0446; G06F 2203/04101; G06F 2203/04107; G06F 3/0445; G06F 2203/04108
See application file for complete search history.

(56) References Cited

U.S. PATENT DOCUMENTS

| | | | |
|---|---|---|---|
| 9,151,792 B1 | 10/2015 | Kremin et al. | |
| 2019/0102010 A1* | 4/2019 | Knabenshue | G06F 3/0442 |
| 2019/0163299 A1* | 5/2019 | Nakanishi | G06F 3/0416 |
| 2023/0194744 A1 | 6/2023 | Yamaguchi | |
| 2023/0297198 A1* | 9/2023 | Yamaguchi | G06F 3/0446 345/173 |

FOREIGN PATENT DOCUMENTS

JP    2023-090378 A    6/2023

* cited by examiner

*Primary Examiner* — Md Saiful A Siddiqui
(74) *Attorney, Agent, or Firm* — K&L Gates LLP

(57) ABSTRACT

According to an aspect, a detection device includes: a sensor circuit including a plurality of sensor electrodes provided to a substrate, a peripheral electrode provided around a detection region provided with the sensor electrodes, and a shield electrode provided to a surface opposite to a surface provided with the sensor electrodes and the peripheral electrode; an AFE circuit configured to generate sensing data corresponding to a distance between the sensor electrodes and a proximity object, based on a detection signal acquired from the sensor electrodes; a drive signal generation circuit configured to generate a drive signal with a substantially sinusoidal waveform and supply the drive signal to the peripheral electrode and the shield electrode; and a control circuit configured to control the AFE circuit and the drive signal generation circuit. The control circuit controls an amplitude value of the drive signal based on the sensing data.

15 Claims, 16 Drawing Sheets

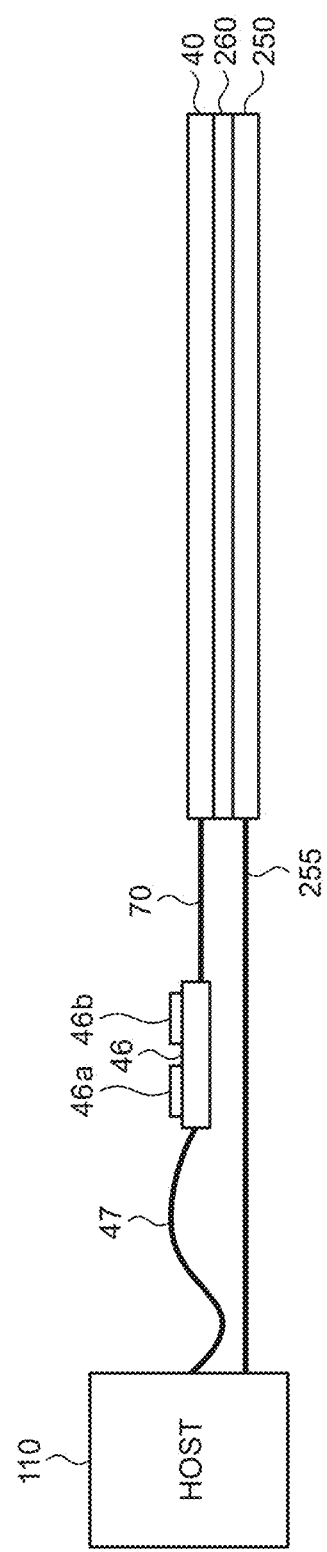

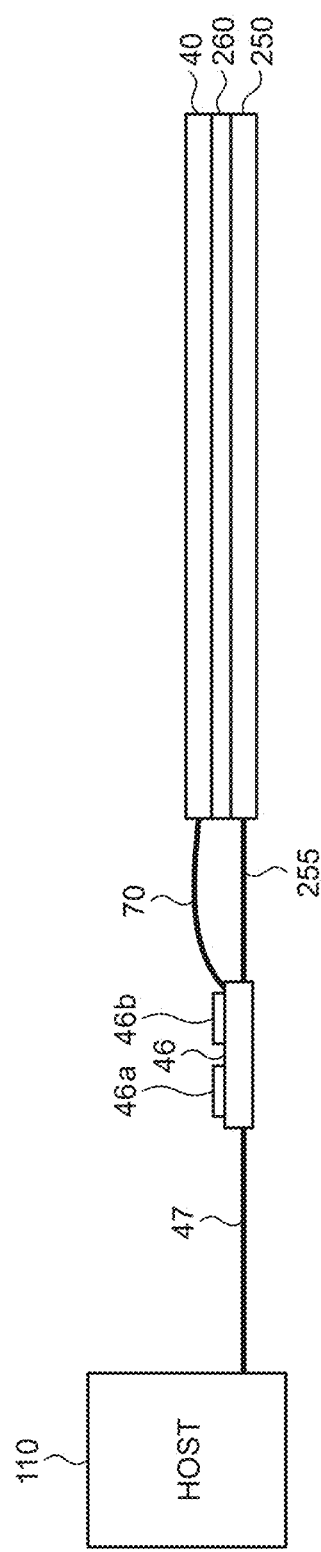

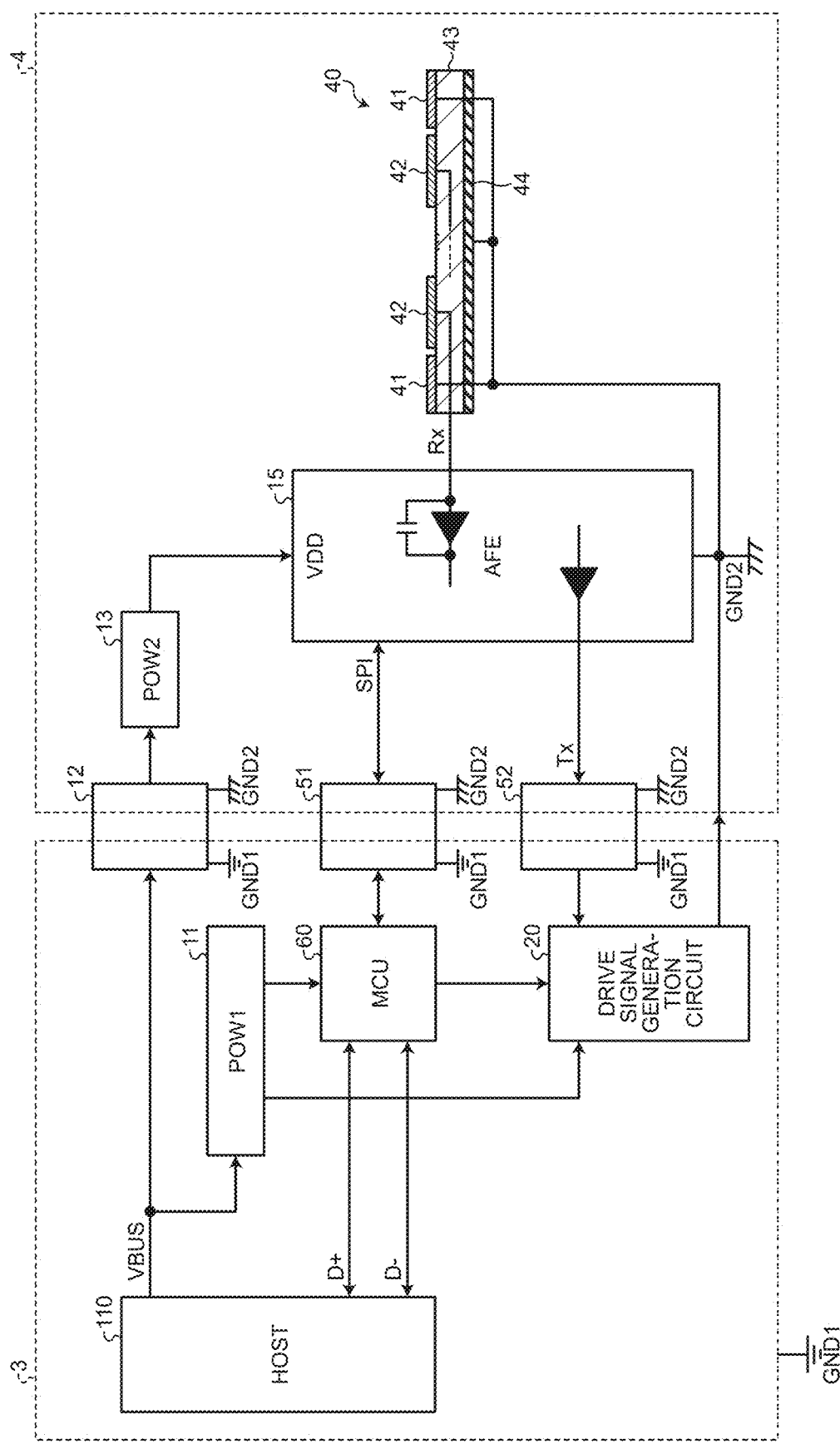

DETECTION DEVICE

CROSS-REFERENCE TO RELATED APPLICATION

This application claims the benefit of priority from Japanese Patent Application No. 2023-176274 filed on Oct. 11, 2023, the entire contents of which are incorporated herein by reference.

BACKGROUND

1. Technical Field

What is disclosed herein relates to a detection device.

2. Description of the Related Art

There has been known a capacitive detection device that detects proximity of an object by detecting changes in capacitance (e.g., U.S. Pat. No. 9,151,792). Such a detection device with what is called a hover detection (proximity detection) function includes a plurality of detection electrodes and a shield electrode disposed around a detection region provided with the detection electrodes, and the shield electrode is supplied with electric signals.

To improve the accuracy in hover detection, there has been developed a configuration that sets the ground potential of a detection circuit to a potential that periodically changes in synchronization with signals for detection and supplies the potential to the shield electrode as the ground potential (e.g., Japanese Patent Application Laid-open Publication No. 2023-90378 (JP-A-2023-90378)). JP-A-2023-90378 discloses a configuration in which a touch panel is stacked on a detection panel for hover detection, thereby enabling to perform both detection of an object that comes into contact with a detection surface (hereinafter also referred to as "touch detection") and hover detection.

Detection devices that can perform both touch detection and hover detection typically include the detection electrodes in each of the detection panel for hover detection and the touch panel. It is desirable for detection devices with a hover detection function to perform both touch detection and hover detection at a lower cost without a touch panel.

In hover detection, it is necessary to relatively increase the drive voltage and the electrode size and set the detection sensitivity high to capture minute changes in capacitance that occur between the detection surface and an object away from the detection surface. Thus, the potential of the detection signal may possibly be saturated when the object shifts from what is called a hover state to a touch state. In addition, capacitive coupling between adjacent electrodes may possibly deteriorate the detection accuracy.

For the foregoing reasons, there is a need for a detection device that dynamically switches between hover detection and touch detection and can improve both hover detection accuracy and touch detection accuracy.

SUMMARY

According to an aspect, a detection device includes: a sensor circuit including a plurality of sensor electrodes provided to a substrate, a peripheral electrode provided around a detection region provided with the sensor electrodes, and a shield electrode provided to a surface opposite to a surface provided with the sensor electrodes and the peripheral electrode; an AFE circuit configured to generate sensing data corresponding to a distance between the sensor electrodes and a proximity object, based on a detection signal acquired from the sensor electrodes; a drive signal generation circuit configured to generate a drive signal with a substantially sinusoidal waveform and supply the drive signal to the peripheral electrode and the shield electrode; and a control circuit configured to control the AFE circuit and the drive signal generation circuit. The control circuit controls an amplitude value of the drive signal based on the sensing data.

BRIEF DESCRIPTION OF THE DRAWINGS

FIG. 3 is a schematic of a first coupling example between the sensor circuit of the detection device according to the first embodiment and the display panel;

FIG. 4 is a schematic of a second coupling example between the sensor circuit of the detection device according to the first embodiment and the display panel;

FIG. 5 is a diagram of an exemplary block configuration of the detection device according to the first embodiment;

DETAILED DESCRIPTION

Figure 1:
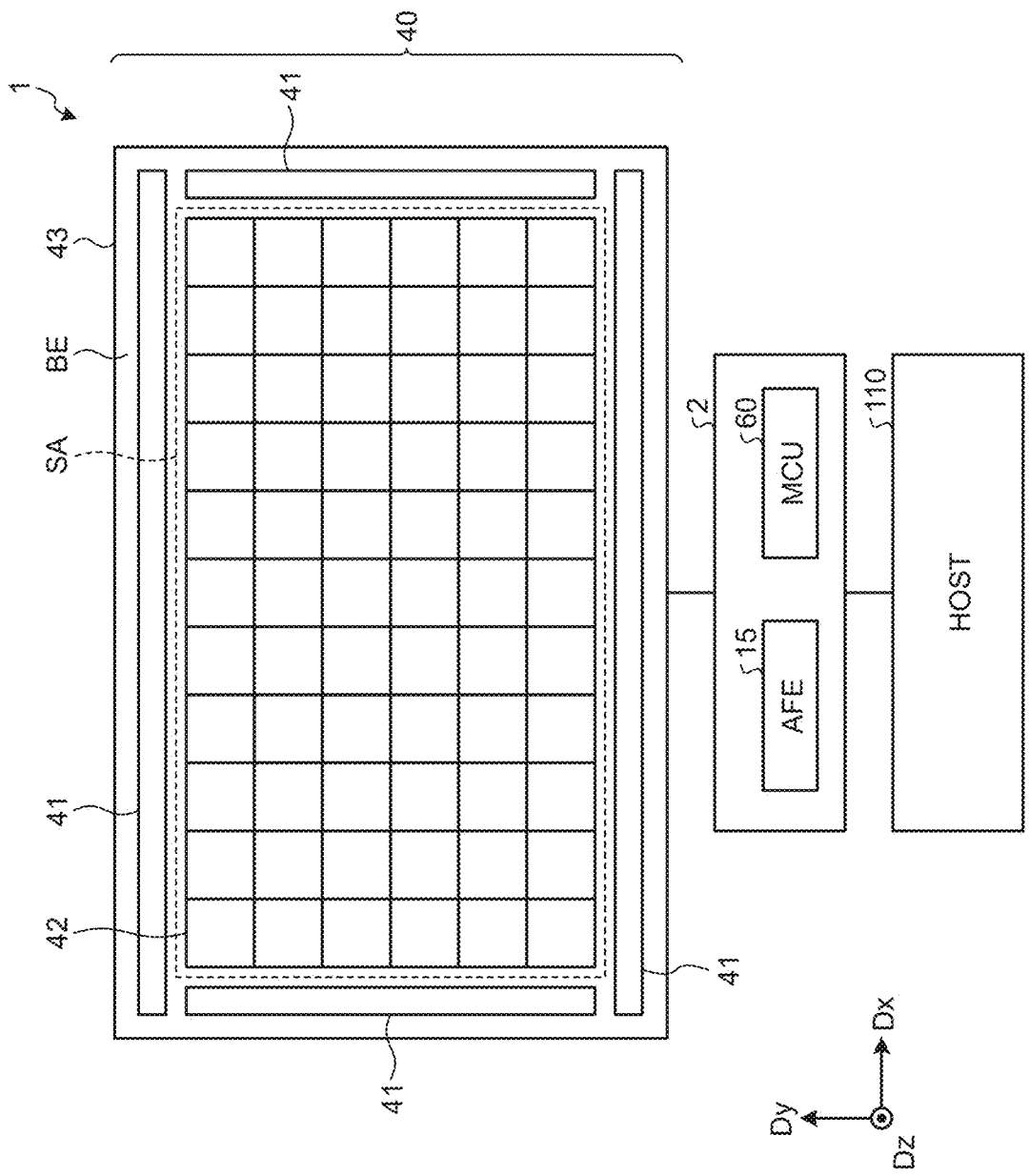
FIG. 1 is a diagram of a main configuration of a detection device according to a first embodiment.

Exemplary aspects (embodiments) to embody the present disclosure are described below in greater detail with reference to the accompanying drawings. The contents described in the embodiments below are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the present disclosure. To make the explanation more specific, the drawings may possibly illustrate the width, the thickness, the shape, and other elements of each component more schematically than the actual aspect. These elements, however, are given by way of example only and are not intended to limit interpretation of the present disclosure. In the present specification and the drawings, components similar to those previously described with reference to previous drawings are denoted by the same reference numerals, and detailed explanation thereof may be omitted as appropriate.

In the present specification and the claims, when the term "on" is used to describe an aspect where a first structure is disposed on a second structure, it includes both of the following cases unless otherwise noted: a case where the first structure is disposed directly on and in contact with the second structure, and a case where the first structure is disposed above the second structure with still another structure interposed therebetween.

First Embodiment

FIG. 1 is a diagram of a main configuration of a detection device 1 according to a first embodiment. As illustrated in FIG. 1, the detection device 1 includes a sensor circuit 40 and a detection circuit 2.

The sensor circuit 40 includes a plurality of sensor electrodes (first electrodes) 42 and a plurality of peripheral electrodes (second electrodes) 41 on a substrate 43. The detection device 1 is a device that can perform both hover detection and touch detection. The hover detection is detecting the position and movement of an object to be detected, such as a finger, when the object to be detected is not in contact with a detection surface of the sensor circuit 40. The touch detection is detecting the position and movement of the object to be detected when the object to be detected is in contact with the detection surface of the sensor circuit 40. The detection device 1 according to the present disclosure performs self-capacitance type hover detection and touch detection. In other words, the sensor circuit 40 of the detection device 1 has two detection modes: a hover detection mode (first detection mode) for detecting the position and movement of the object to be detected when the object to be detected is not in contact with the detection surface of the sensor circuit 40, and a touch detection mode (second detection mode) for detecting the position and movement of the object to be detected when the object to be detected is in contact with the detection surface of the sensor circuit 40.

The sensor circuit 40 has a detection region SA and a peripheral region BE outside the detection region SA. The detection region SA is a region provided with the sensor electrodes 42 to detect the object to be detected in proximity to the detection surface. The peripheral region BE is a region positioned outside the detection region SA and not provided with the sensor electrodes 42. The peripheral region BE is a region provided with the peripheral electrodes 41 along the four sides of the detection region SA.

In the following description, a first direction Dx is one direction in a plane parallel to the substrate 43. A second direction Dy is one direction in the plane parallel to the substrate 43 and is orthogonal to the first direction Dx. The second direction Dy may intersect the first direction Dx without being orthogonal thereto. A third direction Dz is a direction orthogonal to the first direction Dx and the second direction Dy and is normal to the main surface of the substrate 43. The term "plan view" refers to the positional relation when viewed in a direction perpendicular to the substrate 43.

A plurality of sensor electrodes 42 are disposed in a matrix (row-column configuration) in the detection region SA of the substrate 43. In other words, the sensor electrodes 42 are adjacently arrayed in the first direction Dx and the second direction Dy. The sensor electrodes 42 are each electrically coupled to an AFE circuit 15 via wiring (not illustrated).

The peripheral electrodes 41 are disposed surrounding the sensor electrodes 42 provided in the detection region SA. The peripheral electrodes 41 and the sensor electrodes 42 are electrodes adjacently disposed on the substrate 43. A shield electrode 44, which will be described later, is provided on the surface of the substrate 43 opposite to the surface provided with the sensor electrodes 42 and the peripheral electrodes 41. The shield electrode 44 is a film- or plate-like electrode facing the sensor electrodes 42 with the substrate 43 interposed therebetween.

The sensor circuit 40 is coupled to the detection circuit 2. The detection circuit 2 includes an AFE circuit 15, a control circuit 60, and other components. The AFE circuit 15 performs hover detection based on the output from the sensor circuit 40. The control circuit 60 controls the hover detection operation performed by the AFE circuit 15. The AFE circuit 15 is an analog front-end (AFE) circuit, for example. The control circuit 60 includes a micro control unit (MCU), for example.

The detection circuit 2 is coupled to a processing device (external processing device) 110. The processing device 110 is a device that functions as a host computer (HOST) of the detection device 1 according to the first embodiment. The processing device 110 is a point of sale (POS) cash register terminal device, for example. The processing device 110 is not limited thereto and may be any terminal device that can accept hover operations on the detection device 1.

Figure 2A:
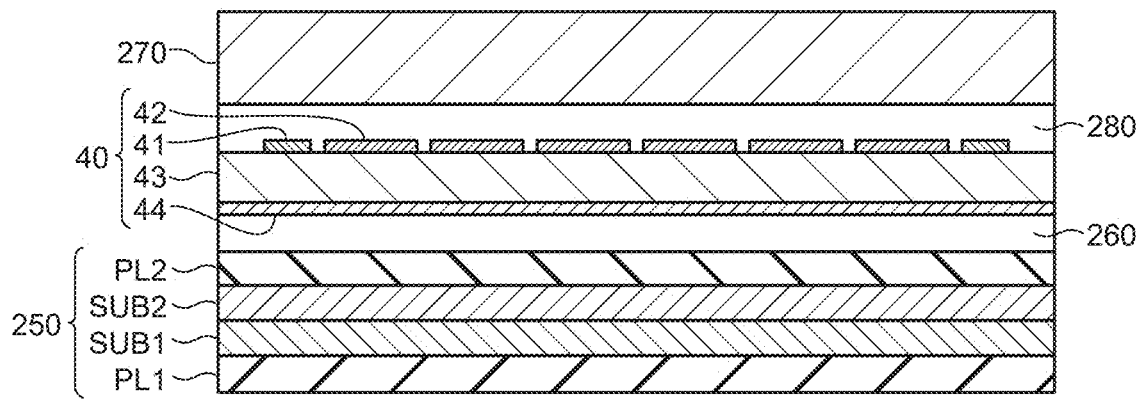
FIG. 2A is a schematic of an exemplary schematic sectional configuration in which a sensor circuit of the detection device according to the first embodiment is stacked on a display panel.

FIG. 2A is a schematic of an exemplary schematic sectional configuration in which the sensor circuit 40 of the detection device 1 according to the first embodiment is stacked on a display panel 250. The display panel 250 is a display panel that displays and outputs images. FIG. 3 is a schematic of a first coupling example between the sensor circuit 40 of the detection device 1 according to the first embodiment and the display panel 250. FIG. 3 illustrates an example of what is called an on-cell device in which the sensor circuit 40 of the detection device 1 according to the first embodiment is mounted on the display panel 250.

The display panel 250 includes an array substrate SUB1, a counter substrate SUB2, a first polarizing plate PL1, and a second polarizing plate PL2. The first polarizing plate PL1, the array substrate SUB1, the counter substrate SUB2, and the second polarizing plate PL2 are stacked in this order.

The array substrate SUB1 is a drive circuit substrate for driving a plurality of pixels. The counter substrate SUB2 is provided facing the array substrate SUB1. A liquid crystal layer serving as a display function layer is provided between the array substrate SUB1 and the counter substrate SUB2.

The sensor circuit 40 is bonded to the top of the display panel 250 with an adhesive layer 260 interposed therebetween. The adhesive layer 260 is an optical clear adhesive (OCA), for example.

The sensor electrodes 42 and the peripheral electrodes 41 are provided on the same substrate 43. The substrate 43 is a film- or plate-like member made of insulating material and is a resin film or a glass substrate, for example. The sensor electrodes 42 and the peripheral electrodes 41 are not necessarily provided in the same layer on the substrate 43 and may be provided in different layers on the substrate 43. The sensor electrode 42 is made of a light-transmitting conductive material, such as indium tin oxide (ITO) and indium zinc oxide (IZO). The peripheral electrode 41 may be made of the same material as that of the sensor electrode 42 or material, such as metal material, different from that of the sensor electrode 42.

A cover member 270 is provided on the sensor circuit 40 with an adhesive layer 280 interposed therebetween. The adhesive layer 280 is an OCA, for example. A shield electrode 44 is provided on the surface of the substrate 43 opposite to the surface provided with the sensor electrodes 42 and the peripheral electrodes 41. In other words, the shield electrode 44 is provided between the display panel 250 and the surface of the sensor circuit 40 opposite to the surface provided with the cover member 270. The adhesive layer 260 is in contact with the shield electrode 44 provided to the sensor circuit 40.

The shield electrode 44 contains light-transmitting conductive oxide, such as ITO and IZO, or metal, for example. Examples of the metal include, but are not limited to, molybdenum, tungsten, tantalum, aluminum, copper, etc. (0-valent metal). The shield electrode 44 may have a single-layered or multilayered structure. The shield electrode 44 that has a multilayered structure may include an oxide-containing layer and a metal-containing layer. The shield electrode 44 simply needs to be a light-transmitting conductive layer and can be called a transparent (light-transmitting) conductive layer.

The shield electrode 44 is supplied with a second reference potential, which will be described later. The shield electrode 44 is also supplied with the same signal as that supplied to the peripheral electrodes 41. The shield electrode 44 provided between the sensor circuit 40 and the display panel 250 can block noise output from the display panel 250 and superimposed on the sensor electrodes 42 of the sensor circuit 40.

The cover member 270 is bonded to the top of the sensor circuit 40. The cover member 270 is a glass substrate or a resin substrate, for example. The upper surface of the cover member 270 serves as the detection surface in hover detection.

Figure 2B:
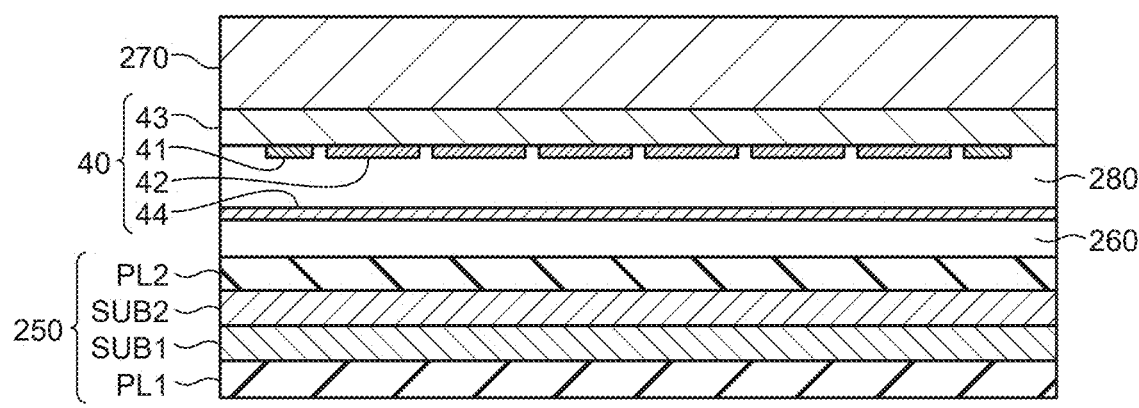
FIG. 2B is a schematic of a modification of the schematic sectional configuration illustrated in FIG. 2A.

Instead of the schematic sectional configuration illustrated in FIG. 2A, the schematic sectional configuration illustrated in FIG. 2B may be employed. FIG. 2B is a schematic of a modification of the schematic sectional configuration illustrated in FIG. 2A.

The display panel 250 is a liquid crystal display (LCD) panel, for example. In this case, a backlight is provided on the side opposite to the sensor circuit 40 across the display panel 250. The display panel 250 is not limited thereto and may be an organic light-emitting diode (OLED) display panel or an inorganic EL display panel (micro-LED or mini-LED), for example. Alternatively, the display panel 250 may be an electrophoretic display (EPD) panel including electrophoretic elements as display elements.

In what is called an on-cell device configuration illustrated in FIG. 3, the detection device 1 includes a flexible printed circuit (FPC) 70. The FPC 70 is coupled to a printed circuit board (PCB) 46. The PCB 46 is provided with various circuits constituting the detection circuit 2. FIG. 3 illustrates circuits 46a and 46b as an example of the various circuits constituting the detection circuit 2. The circuits 46a and 46b are circuits that function as the AFE circuit 15 and the control circuit 60, for example.

The display panel 250 is provided with an FPC 255. The FPC 255 is provided with various circuits related to the operations of the display panel 250. The PCB 46 is coupled to the processing device 110 via a cable 47. The cable 47 has a function of transmitting signals generated between the detection device 1 and the processing device 110. The cable 47 is a universal serial bus (USB) cable, for example.

FIG. 4 is a schematic of a second coupling example between the sensor circuit 40 of the detection device 1 according to the first embodiment and the display panel 250. FIG. 4 illustrates an example of what is called an in-cell or hybrid device in which the sensor circuit 40 of the detection device 1 according to the first embodiment is incorporated and integrated with the display panel 250. Incorporating and integrating the sensor circuit 40 of the detection device 1 according to the first embodiment with the display panel 250 includes, for example, using some components such as substrates and electrodes as some components used for the display panel 250 and some component used for the sensor circuit 40 of the detection device 1 according to the first embodiment.

In what is called an in-cell or hybrid device configuration illustrated in FIG. 4, the FPC 255 is coupled to the PCB 46. In this case, the cable 47 further has a function of transmitting signals generated between the display panel 250 and the processing device 110.

FIG. 5 is a diagram of an exemplary block configuration of the detection device 1 according to the first embodiment.

As illustrated in FIG. 5, the detection device 1 includes a first power supply circuit 11 (POW1), an isolated DC-DC converter 12, a second power supply circuit 13 (POW2), a drive signal generation circuit 20, a first isolator 51, and a second isolator 52 besides the sensor circuit 40, the AFE circuit 15, and the control circuit 60 described above.

The processing device 110, the control circuit 60, the first power supply circuit 11, and the drive signal generation circuit 20 according to the present disclosure are included in a first reference potential block 3. The second power supply circuit 13, the AFE circuit 15, and the sensor circuit 40 according to the present disclosure are included in a second reference potential block 4. The processing device 110, the control circuit 60, the first power supply circuit 11, and the drive signal generation circuit 20 included in the first reference potential block 3 operate with a first reference potential GND1, which is a fixed potential, as the ground potential. The second power supply circuit 13, the AFE circuit 15, and the sensor circuit 40 included in the second reference potential block 4 operate with a second reference potential GND2 generated by the drive signal generation circuit 20 as the ground potential.

The first power supply circuit 11 converts electric power supplied via a power line VBUS of a USB cable into voltage and supplies the voltage to the control circuit 60 and the drive signal generation circuit 20.

The isolated DC-DC converter 12 provides insulation and transmits electric power between the processing device 110 and the second power supply circuit 13. The isolated DC-DC converter 12 performs magnetically isolated power transmission.

In the isolated DC-DC converter 12, electric power is supplied to the coil on the first reference potential block 3 side via the power line VBUS of the USB cable, and the coil generates a magnetic field. The coil on the second reference potential block 4 side is provided within an area that can be affected by the magnetic field generated by the coil on the first reference potential block 3 side.

The coil on the second reference potential block 4 side generates an induced electromotive force due to the magnetic field generated by the coil on the first reference potential block 3 side. The electric power generated in the coil on the second reference potential block 4 side is supplied to the second power supply circuit 13.

The second power supply circuit 13 converts the electric power supplied from the isolated DC-DC converter 12 into voltage and supplies the voltage to the AFE circuit 15.

The AFE circuit 15 generates a square wave signal Tx as a periodic signal that changes in potential periodically. The square wave signal Tx contains fundamental frequency components and harmonic components of the drive signal supplied to the peripheral electrodes 41 and the shield electrode 44 of the sensor circuit 40.

The AFE circuit 15 acquires sensing data from the sensor electrodes 42 and outputs the sensing data to the control circuit 60 via the first isolator 51.

Signals between the AFE circuit 15 and the control circuit 60 according to the present disclosure are transmitted by a serial peripheral interface (SPI), which is a clock synchronous serial interface. The serial interface for transmitting the signals between the AFE circuit 15 and the control circuit 60 is not limited to SPI.

The first isolator 51 provides insulation and transmits signals between the control circuit 60 and the AFE circuit 15. The electrical signals input and output via the first isolator 51 are synchronized between the control circuit 60 and the AFE circuit 15.

The second isolator 52 provides insulation and transmits the square wave signals Tx between the AFE circuit 15 and the drive signal generation circuit 20. The square wave signals Tx input and output via the second isolator 52 are synchronized between the AFE circuit 15 and the drive signal generation circuit 20.

The second isolator 52 performs signal transmission by an optical isolation technology using a photocoupler, for example. The method of signal transmission between the control circuit 60 and the AFE circuit 15 by the first isolator 51 may be the same as or different from that of the second isolator 52. In other words, examples of the first isolator 51 include, but are not limited to, a photocoupler using an optical isolation technology, a digital isolator using a magnetic isolation technology, like the isolated DC-DC converter 12, etc.

The first isolator 51 can perform bidirectional signal transmission from the control circuit 60 to the AFE circuit 15 and from the AFE circuit 15 to the control circuit 60. If a photocoupler using an optical isolation technology is used as the first isolator 51, the photocoupler that transmits signals from the control circuit 60 to the AFE circuit 15 is coupled in parallel with the photocoupler that transmits signals from the AFE circuit 15 to the control circuit 60.

The control circuit 60 transmits and receives signals, such as various kinds of information on sensing data and control commands, to and from the processing device 110.

Based on reference information (DP control reference data) indicating the correspondence relation between the fundamental frequency of the square wave signal Tx that is output from the AFE circuit 15 and the electrical resistance of a digital potentiometer 22, which will be described later, the control circuit 60 outputs, to the digital potentiometer 22, an electrical resistance setting command to set the electrical resistance of the digital potentiometer 22 to an electrical resistance corresponding to the fundamental frequency of the square wave signal Tx that is output from the AFE circuit 15. As a result, the electrical resistance of the digital potentiometer 22 is controlled to be the electrical resistance corresponding to the fundamental frequency of the square wave signal Tx.

The control circuit 60 also performs noise determination on the sensing data and position determination (coordinate calculation) of determining the position of the object to be detected based on the sensing data. The noise determination is processing performed to determine the amount of noise components in the sensing data. The coordinate calculation is arithmetic processing performed to determine the position of the object to be detected in proximity to the sensor circuit 40. Specifically, the coordinate calculation can derive the position in the first direction Dx, the position in the second direction Dy, and the position in the third direction Dz (refer to FIG. 1) of the object to be detected in proximity to the sensor circuit 40, for example. Detailed explanation of the noise determination and the coordinate calculation is omitted herein because they are the same as those well-known.

Signals between the control circuit 60 and the processing device 110 according to the present disclosure are transmitted by USB, which is a serial interface. Specifically, the signals between the control circuit 60 and the processing device 110 are transmitted via signal lines D+ and D− of a USB cable. The serial interface for transmitting the signals between the control circuit 60 and the processing device 110 is not limited to USB.

In the configuration described above, the first reference potential block 3 including the processing device 110, the control circuit 60, the first power supply circuit 11, and the drive signal generation circuit 20 is electrically insulated from the second reference potential block 4 including the second power supply circuit 13, the AFE circuit 15, and the sensor circuit 40 by the isolated DC-DC converter 12, the first isolator 51, and the second isolator 52.

The first reference potential GND1 supplied to the first reference potential block 3 as the ground potential is a fixed potential held by a large electrode, such as a solid electrode. By contrast, the second reference potential GND2 supplied to the second reference potential block 4 as the ground potential corresponds to a periodic signal that changes in potential periodically and is generated by the drive signal generation circuit 20.

In the detection device 1 according to the present disclosure, a period of change in potential of the periodic signal (second reference potential GND2) is the same as the generation period of the square wave generated by the AFE circuit 15 (square wave period of the square wave signal Tx). In other words, the second reference potential GND2 is a potential that periodically changes in synchronization with the square wave signal Tx generated by the AFE circuit 15.

Next, the drive signal generation circuit 20 is described. Before specifically describing the drive signal generation circuit 20 of the detection device 1 according to the first embodiment, the configuration and operations of a drive signal generation circuit 20a according to a comparative example is described.

Figure 6:
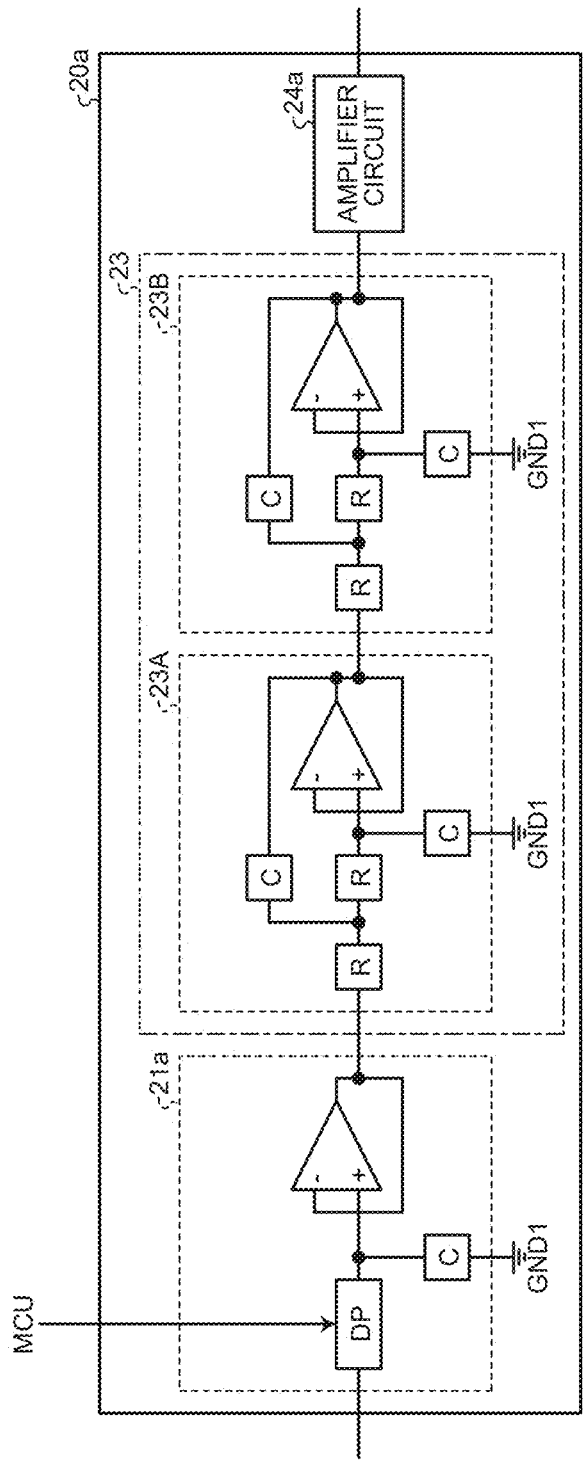
FIG. 6 is a diagram of an exemplary configuration of a drive signal generation circuit according to a comparative example.

FIG. 6 is a diagram of an exemplary configuration of the drive signal generation circuit according to the comparative example. In the configuration according to the comparative example, the drive signal generation circuit 20a includes an LPF circuit 21a, an active filter (AF) circuit 23, and an amplifier circuit 24a.

The LPF circuit 21a generates an intermediate wave signal based on the square wave signal Tx output from the AFE circuit 15 via the second isolator 52.

In the configuration of the drive signal generation circuit 20a according to the comparative example, the LPF circuit 21a includes a digital potentiometer (DP) 22. The digital potentiometer 22 is a digital potentiometer circuit that can adjust the electrical resistance in accordance with a command from the control circuit 60. The digital potentiometer 22 is provided on the output transmission path for the square wave signal Tx that is output from the AFE circuit 15 via the second isolator 52. The digital potentiometer 22 is hereinafter also referred to as "DP circuit 22". Specifically, the electrical resistance of the DP circuit 22 is controlled such that an amplitude value Vpp of the drive signal output from the amplifier circuit 24a in the subsequent stage is constant (e.g., 6.8 V) independently of the setting of the fundamental frequency of the square wave signal Tx.

The LPF circuit 21a functions as a low-pass filter (LPF) using an RC circuit composed of the DP circuit 22 and a capacitive element C in the subsequent stage. A voltage follower circuit provided in the output stage of the RC circuit and coupled to the RC circuit converts the impedance of the intermediate wave signal and outputs the converted signal to the active filter circuit 23.

In the configuration illustrated in FIG. 6, the active filter circuit 23 includes a first filter circuit 23A and a second filter circuit 23B. The active filter circuit 23 is a Sallen-Key fourth-order active LPF illustrated in FIG. 6, for example. Detailed description of the configuration of the first filter circuit 23A and the second filter circuit 23B is omitted.

The LPF circuit 21a and the active filter circuit 23 provide an output signal with a substantially sinusoidal waveform (hereinafter referred to simply as "sinusoidal signal") obtained by reducing high-frequency components of the square wave signal that is output from the AFE circuit 15 via the second isolator 52. This can prevent the amplifier circuit 24a in the subsequent stage from amplifying unnecessary noise components, and thus preventing increase in radiation noise.

The amplifier circuit 24a is an inverting amplifier circuit that inverts and amplifies the sinusoidal signal output from the active filter circuit 23, and also converts the impedance of the signal. The sinusoidal signal inverted and amplified by the amplifier circuit 24a is supplied as the drive signal to the peripheral electrodes 41 and the shield electrode 44 of the sensor circuit 40 and is also supplied as the second reference potential GND2 serving as the ground potential of the second reference potential block 4. The amplifier circuit 24a does not necessarily perform polarity inversion depending on the polarity of the sinusoidal signal.

Figure 7:
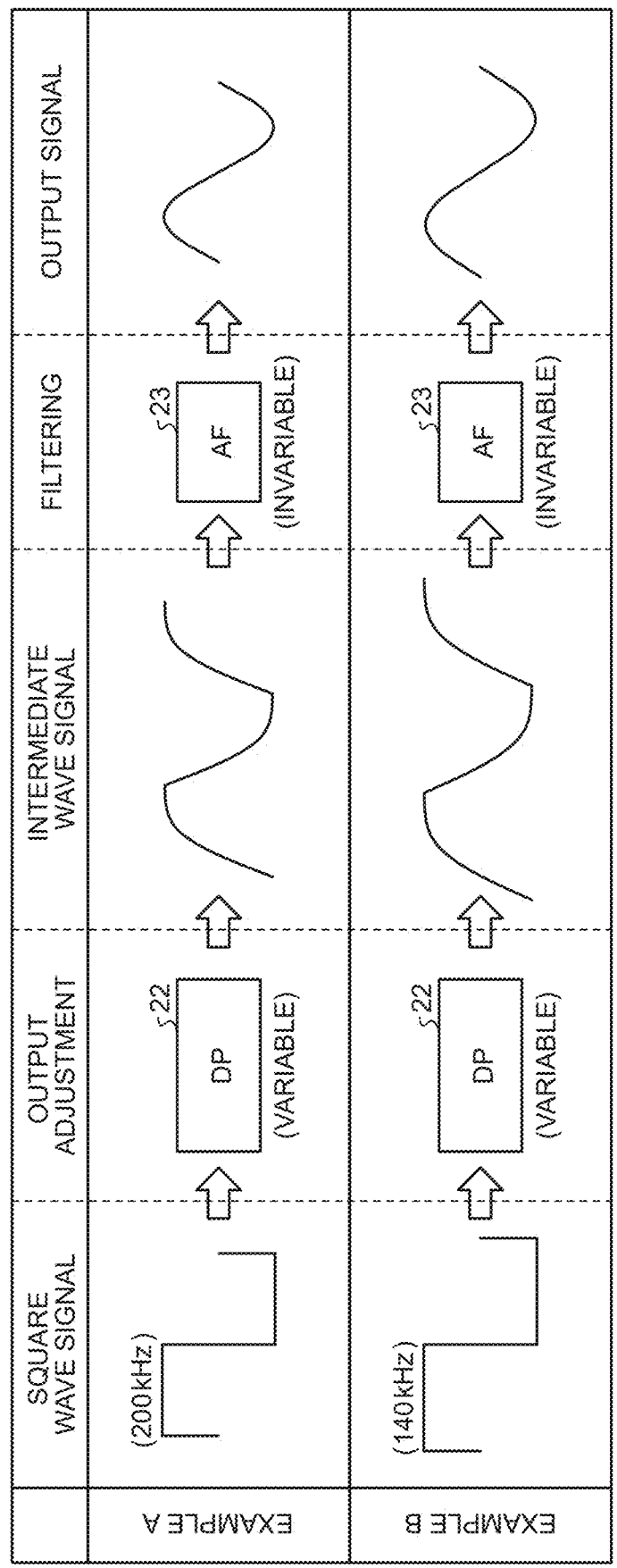
FIG. 7 is a schematic of an example of signal waveform transition in the drive signal generation circuit according to the comparative example.

FIG. 7 is a schematic of an example of signal waveform transition in the drive signal generation circuit according to the comparative example. The square wave signal output from the AFE circuit 15 is adjusted by the electrical resistance of the DP circuit 22 and thus becomes an intermediate wave signal. The intermediate wave signal output from the LPF circuit 21a is filtered through the active filter circuit 23 and becomes an output signal with a substantially sinusoidal waveform.

The AFE circuit 15 according to the present disclosure has a function of setting the fundamental frequency of the square wave signal Tx within a range of 140 kHz to 200 kHz. Example A in FIG. 7 illustrates the case where the fundamental frequency of the square wave signal Tx is 200 kHz. Example B in FIG. 7 illustrates the case where the fundamental frequency of the square wave signal Tx is 140 kHz. The frequency setting range (140 kHz to 200 kHz) of the square wave signal Tx in the AFE circuit 15 is given by way of example only, and the present embodiment is not limited thereto.

Figure 8:
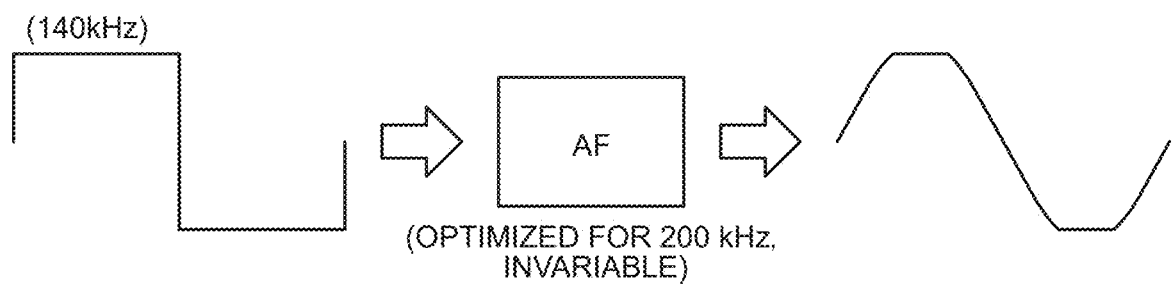
FIG. 8 is a schematic of an example of the function of an active filter.

FIG. 8 is a schematic of an example of the function of an active filter. When a low-pass filter is used to generate a signal with a substantially sinusoidal waveform from a square wave signal, and the setting of the low-pass filter is optimized for a high frequency square wave signal (e.g., 200 kHz), a lower frequency square wave signal (e.g., 140 kHz) filtered therethrough becomes a sinusoidal signal having a large amplitude, and the signal is saturated by the power supply potential of the amplifier circuit 24a. As a result, the sinusoidal signal may possibly have a distorted signal waveform near the peak.

In the present disclosure, the electrical resistance of the DP circuit 22 is controlled to such a value that the amplitude value Vpp of the drive signal output from the amplifier circuit 24a is constant (e.g., 6.8 V) corresponding to the fundamental frequency of the square wave signal Tx output from the AFE circuit 15 (within a frequency setting range of 140 kHz to 200 kHz). Therefore, the detection device 1 according to the present disclosure can generate an output signal with a substantially sinusoidal waveform in which the distortion of time series changes in signal intensity near its peak is reduced as illustrated in FIG. 7.

Figure 9:
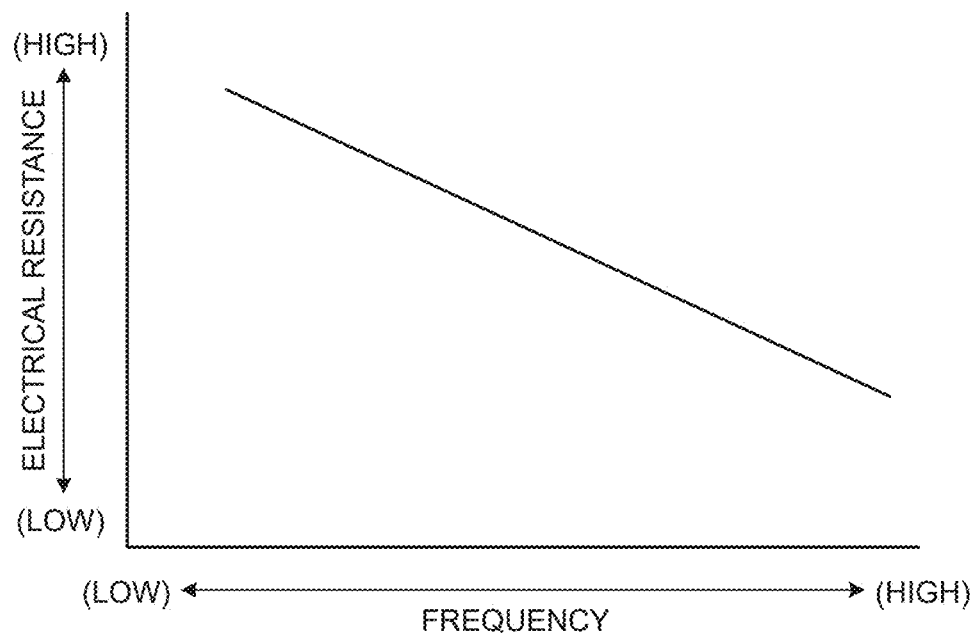
FIG. 9 is a graph schematically illustrating the frequency characteristics of electrical resistance of a digital potentiometer.

FIG. 9 is a graph schematically illustrating the frequency characteristics of the electrical resistance of the digital potentiometer. The horizontal axis in FIG. 9 indicates the fundamental frequency of the square wave signal Tx, and the vertical axis indicates the electrical resistance of the digital potentiometer. FIG. 9 illustrates an example where the electrical resistance of the digital potentiometer is controlled to be higher as the fundamental frequency of the square wave signal Tx is lower and the electrical resistance of the digital potentiometer is controlled to be lower as the fundamental frequency of the square wave signal Tx is higher. Thus, the amplitude value of the drive signal according to the present disclosure is made constant (e.g., 6.8 V) by controlling the electrical resistance of the DP circuit 22 corresponding to the fundamental frequency of the square wave signal Tx.

In the block configuration illustrated in FIG. 5, the sensor electrodes 42 are each coupled to the AFE circuit 15. The peripheral electrodes 41 and the shield electrode 44 function as an active shield the potential of which periodically changes corresponding to changes in the second reference potential GND2 supplied from the drive signal generation circuit 20a. The AFE circuit 15 acquires the electrical signals generated corresponding to the self-capacitance in the sensor electrodes 42 as detection signals Rx.

The magnitude of the detection signal Rx acquired from each sensor electrode 42 varies with the distance between the sensor electrode 42 and a proximity object. The AFE circuit 15 generates sensing data corresponding to the distance between each sensor electrode 42 and the proximity object based on the detection signal Rx acquired from the sensor electrode 42 and outputs the generated data to the control circuit 60.

Figure 10A:
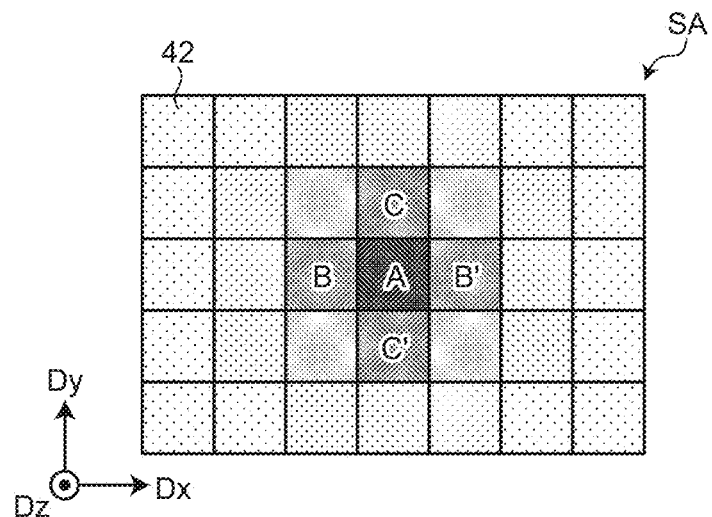
FIG. 10A is a schematic of a heat map of detection values in a detection region.
Figure 10B:
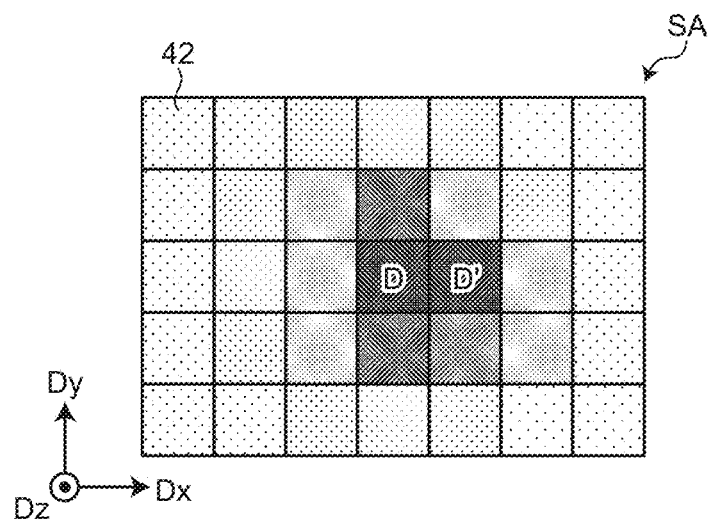
FIG. 10B is a schematic of the heat map of the detection values in the detection region.

FIGS. 10A and 10B are schematics of a heat map of detection values in the detection region. A heat map is defined as a map that visualizes the magnitude of the sensing data using shaded regions corresponding to the sensor electrodes 42 in the detection region SA provided with the sensor electrodes 42 arrayed in a matrix (row-column configuration) illustrated in FIG. 1. The regions with larger sensing data are shaded darker, and the regions with smaller sensing data are shaded lighter.

FIG. 10A illustrates an example where the object to be detected comes into contact with the detection surface of the sensor circuit 40 at position A when the detection region SA is viewed in plan view. FIG. 10B illustrates an example where the object to be detected comes into contact with the detection surface of the sensor circuit 40 near the boundary between positions D and D'.

In the detection device 1 according to the present disclosure, the size of the sensor electrode 42 is increased to capture minute changes in capacitance that occur between the detection surface and an object away from the detection surface. For example, the length of one side of the substantially square sensor electrode 42 is 32 mm. The amplitude value Vpp of the drive signal is 6.8 V. The numerical values described in the present disclosure, such as the size of the sensor electrode 42 and the amplitude value of the drive signal, are given by way of example only, and the numerical values are not limited to those in the present disclosure.

In a configuration where the wiring that couples each sensor electrode 42 to the AFE circuit 15 is provided between the sensor electrodes 42 arrayed in the Dx direction, for example, capacitive coupling occurs between the sensor electrodes 42 adjacently disposed in the Dy direction. In this case, the accuracy of the sensing data at positions C and C' illustrated in FIG. 10A, for example, may possibly deteriorate.

Figure 11A:
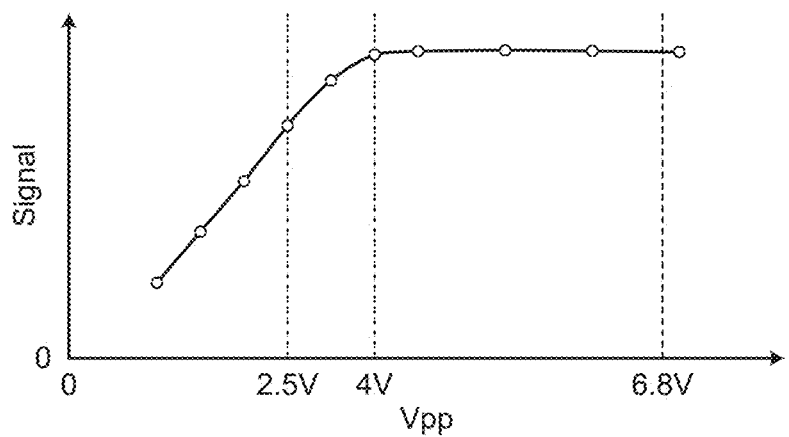
FIG. 11A is a graph of the relation between the amplitude value of a drive signal and sensing data at the contact position of an object to be detected.
Figure 11B:
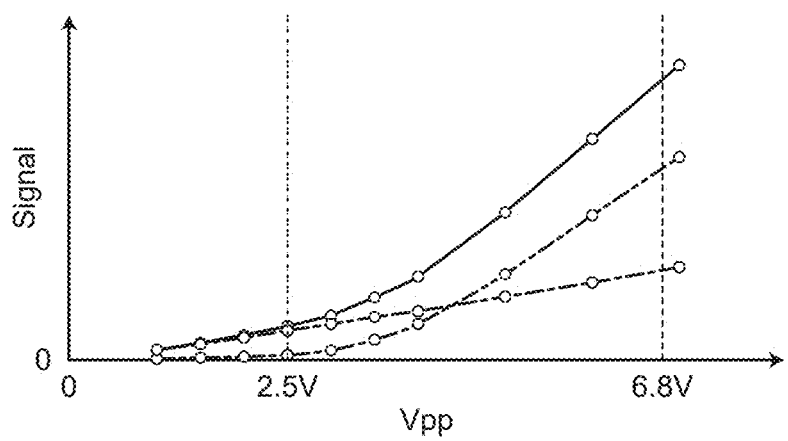
FIG. 11B is a graph of the relation between the amplitude value of the drive signal and a sensing data error due to capacitive coupling.

FIG. 11A is a graph of the relation between the amplitude value of the drive signal and the sensing data at the contact position of the object to be detected. FIG. 11B is a graph of the relation between the amplitude value of the drive signal and a sensing data error due to capacitive coupling. FIGS. 11A and 11B are the graphs of the configuration in which the wiring that couples each sensor electrode 42 to the AFE circuit 15 is provided between the sensor electrodes 42 arrayed in the Dx direction.

FIG. 11A illustrates the sensing data at position A illustrated in FIG. 10A. As illustrated in FIG. 11A, the sensing data at position A illustrated in FIG. 10A where the object to be detected comes into contact with the detection surface of the sensor circuit 40, is significantly larger than the surrounding sensing data, and the amplitude value Vpp of the drive signal is saturated in a region of approximately 4 V or higher. In the example illustrated in FIG. 10B where the object to be detected comes into contact with the detection surface of the sensor circuit 40 near the boundary between the sensor electrodes 42, the sensing data is saturated at both positions D and D' where the object to be detected comes into contact with the sensor circuit 40. As a result, the accuracy in determining the position of the object to be detected by the coordinate calculation of the control circuit 60 may possibly deteriorate.

The solid line in FIG. 11B represents the average of the sensing data at positions C and C' illustrated in FIG. 10A. The alternate long and short dash line in FIG. 11B represents the average of the sensing data at positions B and B' illustrated in FIG. 10A. The alternate long and two short dashes line in FIG. 11B represents the difference obtained by subtracting the average of the sensing data at positions B and B' illustrated in FIG. 10A from the average of the sensing data at positions C and C' illustrated in FIG. 10A.

As indicated by the alternate long and short dash line in FIG. 11B, the sensing data at positions B and B' illustrated in FIG. 10A substantially linearly changes with the change in the amplitude value Vpp of the drive signal. By contrast, as indicated by the solid line in FIG. 11B, when the amplitude value Vpp of the drive signal exceeds 2.5 V, the sensing data at positions C and C' illustrated in FIG. 10A deviates from the sensing data at positions B and B' illustrated in FIG. 10A, which is indicated by the alternate long and two short dashes line in FIG. 11B. This deviation can be considered as a sensing data error due to capacitive coupling generated between the sensor electrodes 42 adjacently disposed in the Dy direction. Besides the saturation of the sensing data at the contact position, the sensing data error due to capacitive coupling increases the probability of deterioration of the accuracy in determining the position of the object to be detected by the coordinate calculation of the control circuit 60.

As illustrated in FIG. 11A, the sensing data is saturated in the region where the amplitude value Vpp of the drive signal is approximately 4 V or higher at the contact position of the object to be detected. As illustrated in FIG. 11B, when the amplitude value Vpp of the drive signal exceeds 2.5 V, the sensing data at positions C and C' illustrated in FIG. 10A has a sensing data error due to capacitive coupling generated in adjacent sensor electrodes 42 as indicated by the alternate long and two short dashes line in FIG. 11B. Therefore, both hover detection and touch detection can be performed by reducing the amplitude value Vpp of the drive signal during touch detection. Specifically, in the examples illustrated in FIGS. 11A and 11B, the amplitude value Vpp of the drive signal for touch detection should be set to 2.5 V or lower, for example.

Figure 12:
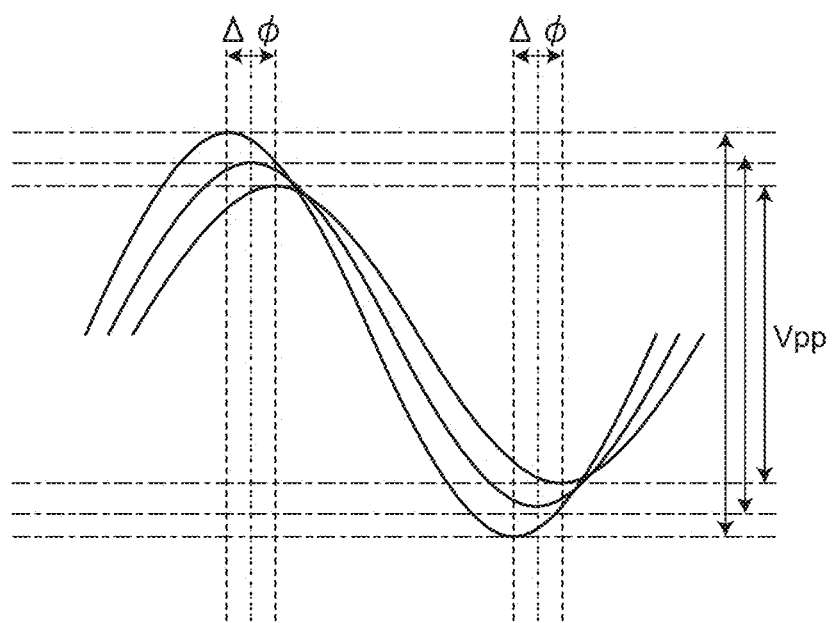
FIG. 12 is a conceptual diagram of an example of phase change of the drive signal when the amplitude value of the drive signal is changed in the configuration of the drive signal generation circuit according to the comparative example.

FIG. 12 is a conceptual diagram of an example of phase change of the drive signal when the amplitude value of the drive signal is changed in the configuration of the drive signal generation circuit according to the comparative example.

As described above, in the configuration of the drive signal generation circuit 20a according to the comparative example illustrated in FIG. 6, the LPF circuit 21a functions as a low-pass filter using the RC circuit composed of the DP circuit 22 and the capacitive element C in the subsequent stage. Therefore, as illustrated in FIG. 12, if the amplitude value Vpp of the drive signal is changed by dynamically changing the electrical resistance of the DP circuit 22 without changing the frequency setting of the square wave signal Tx, a change in phase ($\Delta\varphi$) may possibly occur, thereby deviating the timing of acquiring the sensing data and reducing the detection sensitivity.

The following describes the specific configuration and operation of the drive signal generation circuit 20 of the detection device 1 according to the first embodiment to reduce occurrence of saturation of the sensing data at the contact position and deterioration of the accuracy in determining the position due to the sensing data error caused by capacitive coupling between adjacent sensor electrodes.

Figure 13:
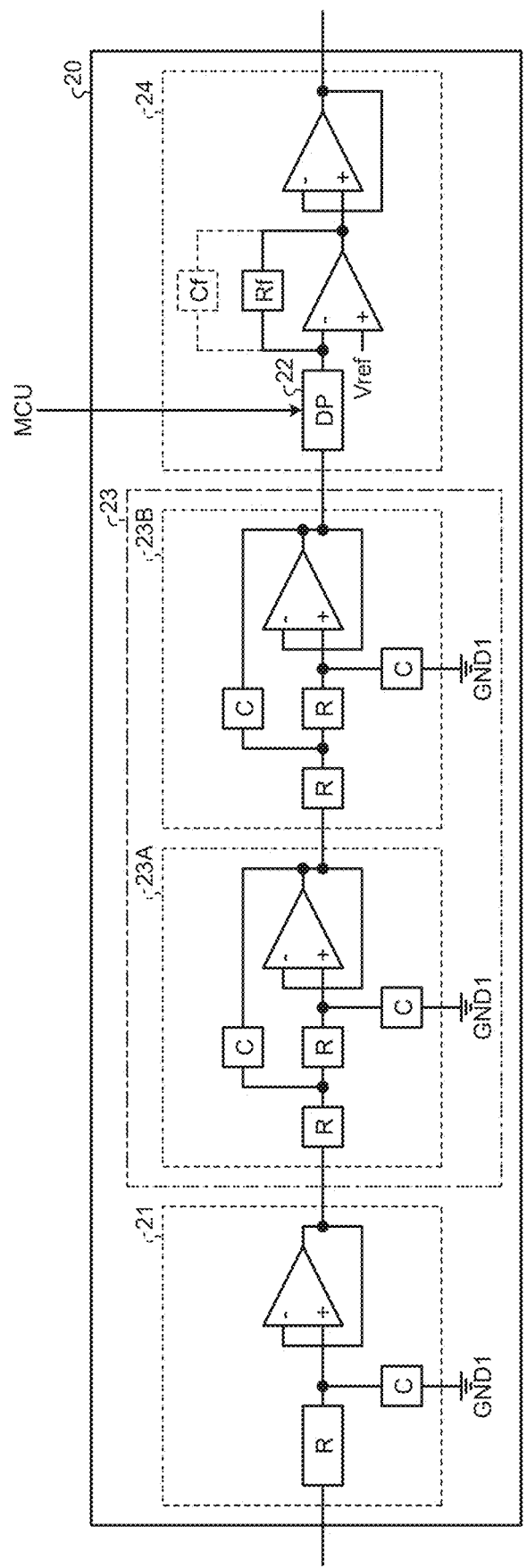
FIG. 13 is a diagram of an exemplary configuration of the drive signal generation circuit according to the first embodiment.

FIG. 13 is a diagram of an exemplary configuration of the drive signal generation circuit according to the first embodiment. In the configuration according to the first embodiment, the drive signal generation circuit 20 includes an LPF circuit 21, the active filter circuit 23, and an amplifier circuit 24. The electrical position of the DP circuit 22 of the drive signal generation circuit 20 according to the first embodiment is different from the electrical position of the DP circuit 22 of the drive signal generation circuit 20a according to the comparative example.

The LPF circuit 21 includes a resistive element R instead of the DP circuit 22. The LPF circuit 21 functions as a low-pass filter using the RC circuit composed of the resistive element R and the capacitive element C in the subsequent stage. A voltage follower circuit provided in the output stage of the RC circuit and coupled to the RC circuit converts the impedance of the intermediate wave signal and outputs the converted signal to the active filter circuit 23.

The amplifier circuit 24 includes the DP circuit 22 as an input resistive element of an inverting amplifier circuit provided with a negative feedback resistive element Rf. The output Vout of the amplifier circuit 24 is expressed by the following Expression 1 when the input of the amplifier circuit 24 is Vin. The configuration may include a capacitive element Cf for phase compensation in parallel with the negative feedback resistive element Rf.

$$Vout = -(Rf/Rdp) \times Vin \quad (1)$$

The impedance of the sinusoidal signal inverted and amplified by the amplifier circuit 24 is converted by the voltage follower circuit provided in the output stage of the inverting amplifier circuit and coupled to the inverting amplifier circuit, and the converted signal is supplied as the drive signal from the voltage follower circuit to the peripheral electrodes 41 and the shield electrode 44 of the sensor circuit 40 and is also supplied as the second reference potential GND2 serving as the ground potential of the second reference potential block 4. The amplifier circuit 24 does not necessarily perform polarity inversion depending on the polarity of the sinusoidal signal.

In the configuration of the drive signal generation circuit 20 according to the first embodiment described above, no phase change occurs in the LPF circuit 21 when the amplitude value Vpp of the drive signal is changed by changing the electrical resistance of the DP circuit 22. Therefore, the drive signal generation circuit 20 can suppress reduction in detection sensitivity due to deviation of the timing of acquiring the sensing data.

Figure 14:
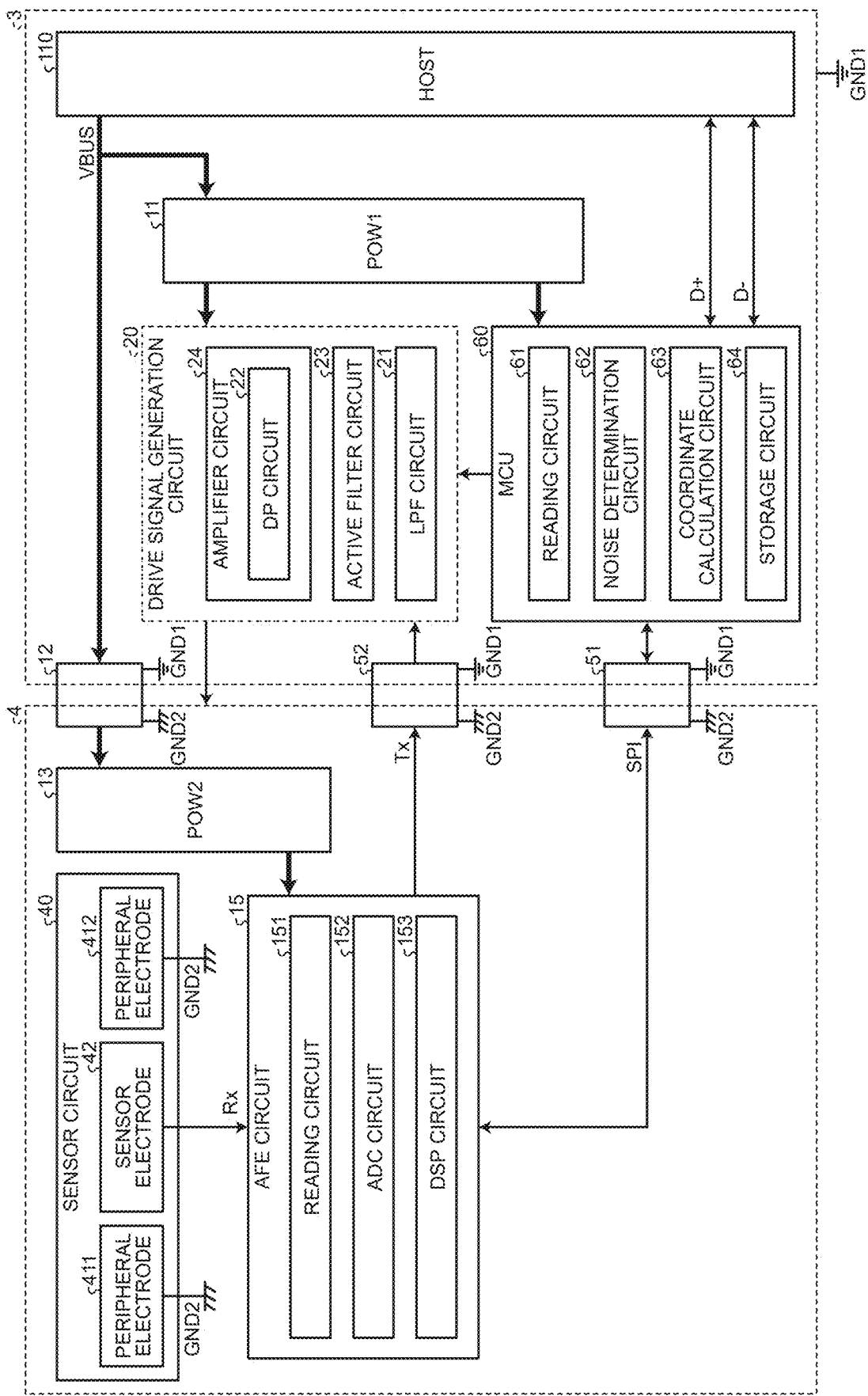
FIG. 14 is a diagram of an exemplary functional circuit block configuration of the detection device according to the first embodiment.

FIG. 14 is a diagram of a functional circuit block configuration of the detection device according to the first embodiment.

As illustrated in FIG. 14, the AFE circuit 15 includes a reading circuit 151, an analog digital converter (ADC) circuit 152, and a digital signal processor (DSP) circuit 153. Each circuit element of the AFE circuit 15 operates with the second reference potential GND2, which is a periodic signal that changes in potential periodically and is generated by the drive signal generation circuit 20, as the ground potential.

The reading circuit 151 acquires the detection signals Rx from the sensor electrodes 42.

The ADC circuit 152 converts the detection signals Rx acquired by the reading circuit 151 from analog signals into digital signals.

The DSP circuit 153 performs digital filtering on digital data, which is digital signals resulting from conversion by the ADC circuit 152, to generate the detection signals Rx.

The AFE circuit 15 outputs the sensing data generated by the DSP circuit 153 to the control circuit 60 via the first isolator 51.

The control circuit 60 includes a reading circuit 61, a noise determination circuit 62, a coordinate calculation circuit 63, and a storage circuit 64. Each circuit element of the control circuit 60 operates with the first reference potential GND1, which is a fixed potential, as the ground potential.

The reading circuit 61 acquires the sensing data output from the AFE circuit 15 via the first isolator 51.

The noise determination circuit 62 performs the noise determination described above based on the sensing data acquired by the reading circuit 61.

The coordinate calculation circuit 63 performs the coordinate calculation described above based on the sensing data acquired by the reading circuit 61.

The storage circuit 64 holds in advance the DP control reference data indicating the correspondence relation between the fundamental frequency of the square wave signal Tx that is output from the AFE circuit 15 and the electrical resistance of the DP circuit 22. The DP control reference data is, for example, data in a table format in which the fundamental frequency of the square wave signal Tx that is output from the AFE circuit 15 corresponds one-to-one to the electrical resistance of the DP circuit 22.

The storage circuit 64 according to the present disclosure stores therein in advance a threshold used when the detection mode is determined in a detection mode setting process, which will be described later.

The control circuit 60 refers to the DP control reference data held in the storage circuit 64 and outputs an electrical resistance setting command to set the electrical resistance of the DP circuit 22 to an electrical resistance corresponding to the fundamental frequency of the square wave signal Tx that is output from the AFE circuit 15.

The control circuit 60 has a function of changing the fundamental frequency of the square wave signal Tx that is output from the AFE circuit 15. When the fundamental frequency of the square wave signal Tx output from the AFE circuit 15 is changed, the control circuit 60 re-sets the electrical resistance of the DP circuit 22 in accordance with the changed fundamental frequency of the square wave signal Tx.

The control circuit 60 according to the present disclosure has a function of changing the fundamental frequency of the square wave signal Tx that is output from the AFE circuit 15. The control circuit 60 according to the present disclosure can change the drive frequency in self-capacitance type hover detection, that is, the fundamental frequency of the square wave signal Tx that is output from the AFE circuit 15. Therefore, the effects of noise can be reduced. The change in the fundamental frequency of the square wave signal Tx is hereinafter also referred to as "frequency hopping".

Figure 15:
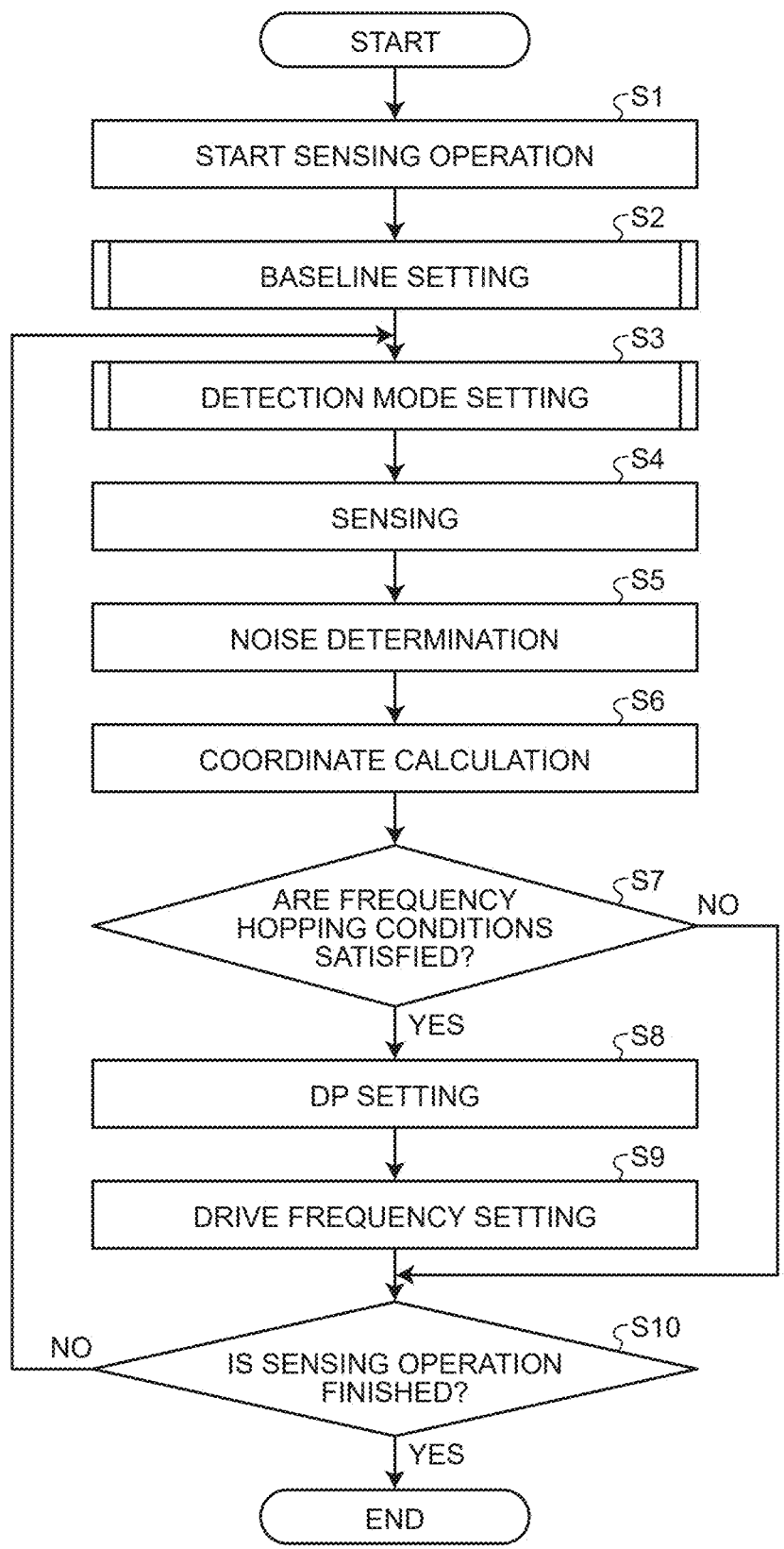
FIG. 15 is a main flowchart of an example of a detection process by the detection device.

FIG. 15 is a main flowchart of an example of the detection process by the detection device. The detection device 1 according to the present disclosure performs a sensing operation by dynamically switching between a hover detection mode (first detection mode) and a touch detection mode (second detection mode) based on the maximum value of the sensing data acquired in the detection region SA.

Figure 16:
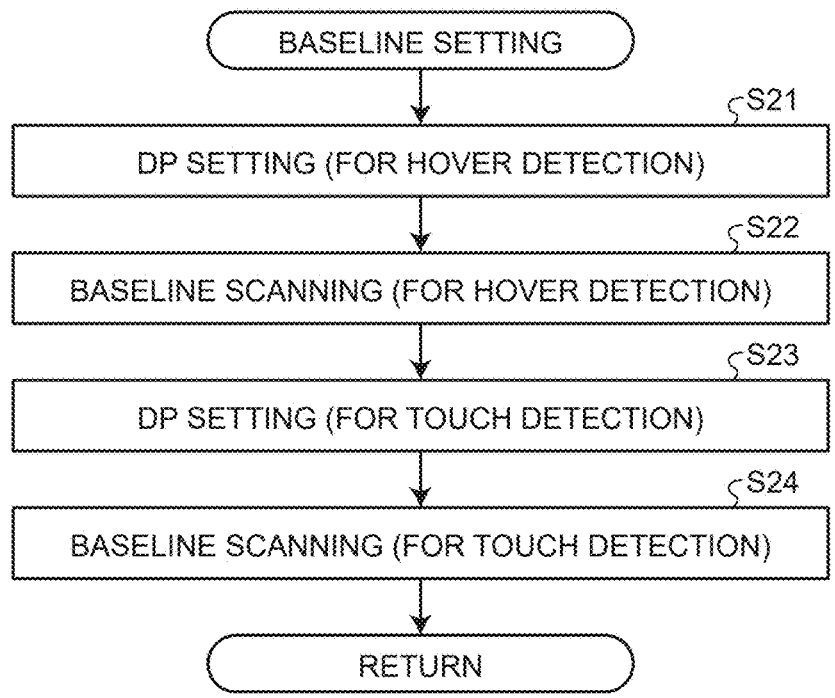
FIG. 16 is a sub-flowchart of an example of a baseline setting process.

When the sensing operation of the detection device 1 starts (Step S1), the detection device 1 sets a baseline for both the hover detection mode and the touch detection mode (Step S2). FIG. 16 is a sub-flowchart of an example of the baseline setting process.

In the baseline setting process (Step S2), the control circuit 60 first sets, in the DP circuit 22, the electrical resistance for hover detection (Step S21). The electrical resistance for hover detection is set to such a value that the amplitude value Vpp of the drive signal is 6.8 V, for example.

When an object to be detected is not in proximity to the sensor circuit 40, the AFE circuit 15 acquires the detection signals Rx from the sensor electrodes 42 and generates baseline data for hover detection based on the detection signals Rx (Step S22: baseline scanning).

Subsequently, the control circuit 60 sets, in the DP circuit 22, the electrical resistance for touch detection (Step S23). The electrical resistance for touch detection is set to such a value that the amplitude value Vpp of the drive signal is 2.5 V, for example.

When an object to be detected is not in proximity to the sensor circuit 40, the AFE circuit 15 acquires the detection signals Rx from the sensor electrodes 42 and generates baseline data for touch detection based on the detection signals Rx (Step S24: baseline scanning).

Figure 17:
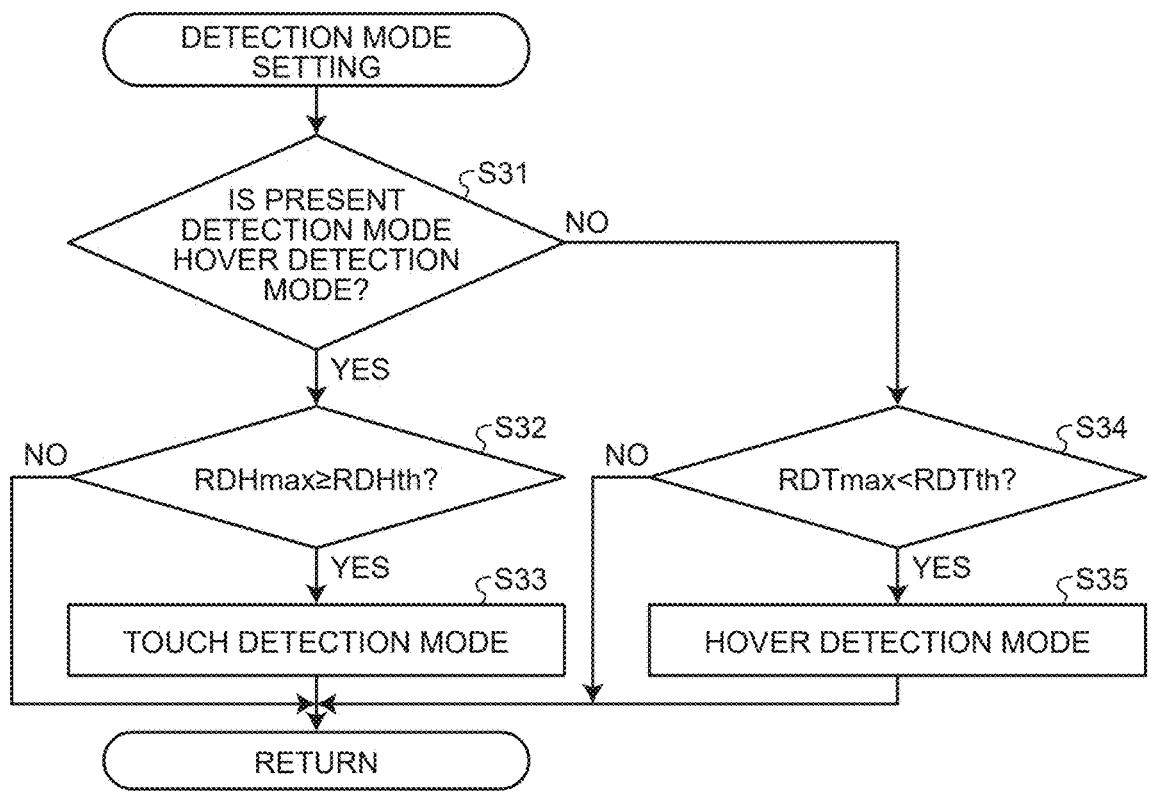
FIG. 17 is a sub-flowchart of an example of a detection mode setting process.

After performing the baseline setting process (Step S2), the detection device 1 returns to the process in the main flowchart of the detection process illustrated in FIG. 15. The AFE circuit 15 acquires the detection signals Rx from the sensor electrodes 42, generates sensing data, and transmits the data to the control circuit 60. The control circuit 60 sets the detection mode based on the sensing data transmitted from the AFE circuit 15 (Step S3). FIG. 17 is a sub-flowchart of an example of the detection mode setting process.

In the detection mode setting process (Step S3), the control circuit 60 first determines whether the present detection mode is the hover detection mode or the touch detection mode. More specifically, the control circuit 60 determines whether or not the present detection mode is the hover detection mode (Step S31).

If the present detection mode is the hover detection mode (Yes at Step S31), the control circuit 60 determines whether the maximum value RDHmax of the sensing data (RDH(n)) in the detection region SA is equal to or larger than a predetermined threshold RDHth (RDHmax≥RDHth, Step S32). n is a natural number from 1 to N, and N is the number of sensor electrodes in the detection region SA. The threshold RDHth is stored in advance in the storage circuit 64.

If the maximum value RDHmax of the sensing data is smaller than the threshold RDHth (No at Step S32), the control circuit 60 maintains the hover detection mode. If the maximum value RDHmax of the sensing data is equal to or larger than the threshold RDHth (Yes at Step S32), the control circuit 60 changes the detection mode from the hover detection mode to the touch detection mode (Step S33).

If the present detection mode is the touch detection mode (No at Step S31), the control circuit 60 determines whether the maximum value RDTmax of the sensing data (RDT(n)) in the detection region SA) is smaller than a predetermined threshold RDTth (RDTmax<RDTth, Step S34). n is a natural number from 1 to N, and N is the number of sensor electrodes in the detection region SA. The threshold RDTth is stored in advance in the storage circuit 64.

If the maximum value RDTmax of the sensing data is equal to or larger than the threshold RDTth (No at Step S34), the control circuit 60 maintains the touch detection mode. If the maximum value RDTmax of the sensing data is smaller than the threshold RDTth (Yes at Step S34), the control circuit 60 changes the detection mode from the touch detection mode to the hover detection mode (Step S35).

As described above, when the object to be detected is in contact with the detection surface of the sensor circuit 40, the sensing data is significantly large at the position where the object to be detected is in contact with the detection surface of the sensor circuit 40. Therefore, it can be determined whether the object to be detected comes into contact with (touches) the detection surface of the sensor circuit 40 by performing threshold determination on the maximum value of the sensing data.

The control circuit 60 sets the electrical resistance of the DP circuit 22 such that the amplitude value Vpp of the drive signal is a value corresponding to the detection mode set by the detection mode setting process (Step S3). Specifically, if the hover detection mode is set by the detection mode setting process (Step S3), the control circuit 60 sets the electrical resistance of the DP circuit 22 such that the amplitude value Vpp of the drive signal is a first amplitude value (e.g., 6.8 V), for example. If the touch detection mode is set by the detection mode setting process (Step S3), the control circuit 60 sets the electrical resistance of the DP circuit 22 such that the amplitude value Vpp of the drive signal is a second amplitude value (e.g., 2.5 V) smaller than the first amplitude value, for example.

After performing the detection mode setting process (Step S3), the detection device 1 returns to the process in the main flowchart of the detection process illustrated in FIG. 15 and performs a normal sensing operation (Step S4). The AFE circuit 15 acquires the detection signals Rx from the sensor electrodes 42, generates sensing data, and transmits the data to the control circuit 60. The noise determination circuit 62 of the control circuit 60 performs the noise determination described above based on the sensing data transmitted from the AFE circuit 15 (Step S5).

The coordinate calculation circuit 63 performs the coordinate calculation based on the difference between the baseline data acquired in the baseline setting process (Step S2) and the sensing data (Step S6).

While the coordinate calculation (Step S6) is performed after the noise determination (Step S5) in FIG. 15, the noise determination (Step S5) may be performed after the coordinate calculation (Step S6), or the noise determination (Step S5) and the coordinate calculation (Step S6) may be performed in parallel.

Subsequently, the control circuit 60 determines whether the conditions for performing the frequency hopping described above (hereinafter also referred to simply as "frequency hopping conditions") are satisfied (Step S7).

If the frequency hopping conditions are not satisfied (No at Step S7), the detection device 1 performs the processing at Step S10.

If the frequency hopping conditions are satisfied (Yes at Step S7), the control circuit 60 sets the electrical resistance of the DP circuit 22 to a value corresponding to the frequency of the square wave signal Tx after frequency hopping (Step S8). The control circuit 60 sets, to the drive frequency after frequency hopping, the fundamental frequency of the square wave signal Tx that is output from the AFE circuit 15 (Step S9).

While FIG. 15 illustrates an example where the drive frequency is set after the electrical resistance of the DP circuit 22 is set, the electrical resistance of the DP circuit 22 may be set after the drive frequency is set. Alternatively, the setting of the electrical resistance of the DP circuit 22 and the setting of the drive frequency may be performed in parallel.

To set the electrical resistance of the DP circuit 22 at Step S8, the control circuit 60 refers to the DP control reference data described above, for example, and sets the electrical resistance of the DP circuit 22 to a value corresponding to the frequency of the square wave signal Tx after frequency hopping. Therefore, the electrical resistance of the DP circuit 22 is controlled to be the electrical resistance corresponding to the square wave signal Tx after frequency hopping. More specifically, if the detection mode is the hover detection mode, the control circuit 60 sets the electrical resistance of the DP circuit 22 such that the amplitude value Vpp of the drive signal is 6.8 V, for example. If the detection mode is the touch detection mode, the control circuit 60 sets the electrical resistance of the DP circuit 22 such that the amplitude value Vpp of the drive signal is 2.5 V, for example.

If the sensing operation by the detection device 1 is finished (Yes at Step S10), the detection device 1 ends the sensing operation. Examples of the case where the sensing operation is finished include, but are not limited to, when supply of electric power to the detection device 1 is stopped, when a command to finish the sensing operation is output from the processing device 110 to the detection device 1, etc. If the sensing operation of the detection device 1 is not finished (No at Step S10), the detection device 1 performs the processing from Step S3 again.

In the configuration according to the first embodiment described above, the control circuit 60 controls the amplitude value Vpp of the drive signal supplied from the drive signal generation circuit 20 to the peripheral electrodes 41 and the shield electrode 44, based on the sensing data output from the AFE circuit 15.

More specifically, in the detection mode setting process (Step S3), when the present detection mode is the hover detection mode (first detection mode), the control circuit 60 maintains the hover detection mode (first detection mode) if the maximum value RDHmax of the sensing data RDH(n) of the sensor electrodes 42 is smaller than the predetermined threshold RDHth, and shifts to the touch detection mode (second detection mode) if the maximum value RDHmax is equal to or larger than the threshold RDHth.

When the present detection mode is the touch detection mode (second detection mode), the control circuit 60 maintains the touch detection mode (second detection mode) if the maximum value RDTmax of the sensing data RDT(n) of the sensor electrodes 42 is equal to or larger than the predetermined threshold RDTth, and shifts to the hover detection mode (first detection mode) if the maximum value RDTmax is smaller than the threshold RDTth.

The control circuit 60 sets the electrical resistance of the DP circuit 22 such that the amplitude value Vpp of the drive signal is a value corresponding to the detection mode set by the detection mode setting process (Step S3).

More specifically, if the detection mode set by the detection mode setting process (Step S3) is the hover detection mode (first detection mode), the control circuit 60 controls the electrical resistance of the DP circuit 22 such that the amplitude value Vpp of the drive signal is the first amplitude value (e.g., 6.8 V).

If the detection mode set by the detection mode setting process (Step S3) is the touch detection mode (second detection mode), the control circuit 60 controls the electrical resistance of the DP circuit 22 such that the amplitude value Vpp of the drive signal is the second amplitude value (e.g., 2.5 V) smaller than the first amplitude value.

Thus, the amplitude value Vpp of the drive signal is controlled to be relatively small in the hover detection mode (first detection mode) and to be relatively large in the touch detection mode (second detection mode). This mechanism can reduce occurrence of saturation of the sensing data at the contact position and deterioration of the accuracy in determining the position due to the sensing data error caused by capacitive coupling between adjacent sensor electrodes when the object to be detected comes into contact with the detection surface of the sensor circuit 40.

In the configuration that filters the square wave signal Tx output from AFE circuit 15 to generate a sinusoidal signal and amplifies the sinusoidal signal to generate the drive signal, the DP circuit 22 is coupled in series to the input path of the amplifier circuit 24. The control circuit 60 can set the fundamental frequency of the square wave signal Tx. The control circuit 60 sets the electrical resistance of the DP circuit 22 relatively larger as the fundamental frequency of the square wave signal Tx is higher and sets the electrical resistance of the DP circuit 22 relatively smaller as the fundamental frequency of the square wave signal Tx is lower.

Therefore, if the frequency hopping conditions are satisfied by the noise determination, and the fundamental frequency of the square wave signal Tx (frequency of the drive signal) is changed, for example, the amplitude value Vpp of the drive signal can be kept constant (e.g., 6.8 V in the hover detection mode and 2.5 V in the touch detection mode).

Second Embodiment

Figure 18A:
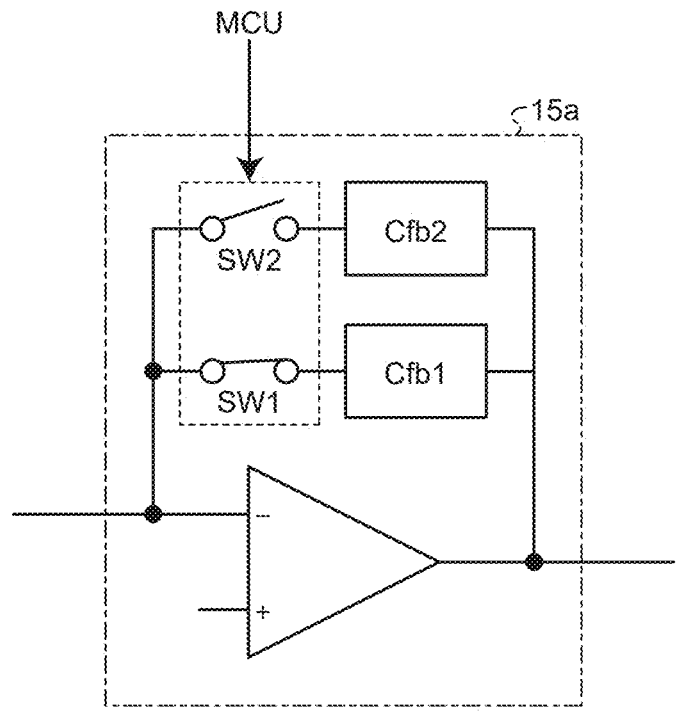
FIG. 18A is a diagram of an exemplary configuration of an AFE circuit according to a second embodiment.
Figure 18B:
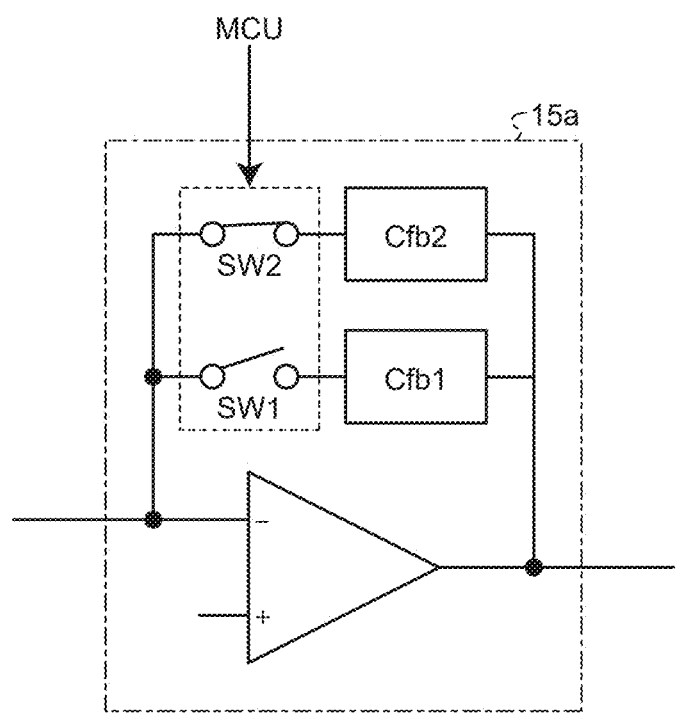
FIG. 18B is a diagram of an exemplary configuration of the AFE circuit according to the second embodiment.

FIGS. 18A and 18B are diagrams of an exemplary configuration of the AFE circuit according to a second embodiment. The block configuration of the detection circuit and the configuration and operation of the drive signal generation circuit are the same as those according to the first embodiment described above, and detailed explanation thereof is omitted herein.

An AFE circuit 15a operates as an integrating circuit in which a negative feedback capacitance is coupled between a non-inverting input terminal and an output terminal of a differential amplifier circuit. As illustrated in FIGS. 18A and 18B, the configuration according to the second embodiment is provided with switch circuits SW1 and SW2 and can dynamically change the capacitance value of the negative feedback capacitance of the integrating circuit. The switch circuits SW1 and SW2 are turned on and off by the control circuit 60.

Specifically, in the example illustrated in FIGS. 18A and 18B, the capacitance value of a negative feedback capacitance Cfb1 is 10 pF, and the capacitance value of a negative feedback capacitance Cfb2 is 35 pF, for example. In the hover detection mode (first detection mode), the switch circuit SW1 is turned on, and the switch circuit SW2 is turned off. In the touch detection mode (second detection mode), the switch circuit SW1 is turned off, and the switch circuit SW2 is turned on. Therefore, the capacitance value of the negative feedback capacitance of the integrating circuit is controlled to be 10 pF in the hover detection mode and to be 35 pF in the touch detection mode.

In the configuration according to the second embodiment described above, the control circuit 60 turns on the switch circuit SW1 and turns off the switch circuit SW2 in the hover detection mode (first detection mode). As a result, the negative feedback capacitance Cfb1 is selectively coupled between the non-inverting input terminal and the output terminal of the differential amplifier circuit.

In the configuration according to the second embodiment described above, the control circuit 60 turns off the switch circuit SW1 and turns on the switch circuit SW2 in the touch detection mode (second detection mode). As a result, the negative feedback capacitance Cfb2 is selectively coupled between the non-inverting input terminal and the output terminal of the differential amplifier circuit.

Thus, the negative feedback capacitance of the integrating circuit is controlled to be relatively small in the hover detection mode (first detection mode) and to be relatively large in the touch detection mode (second detection mode). Therefore, the dynamic range of the AFE circuit 15a can be made larger in the touch detection mode (second detection mode) than in the hover detection mode (first detection mode). Consequently, the configuration according to the second embodiment can reduce occurrence of saturation of the sensing data when the object to be detected comes into contact with the detection surface of the sensor circuit 40 as compared with the configuration according to the first embodiment.

While exemplary embodiments according to the present disclosure have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the present disclosure. At least one of various omissions, substitutions, and modifications of the components may be made without departing from the gist of the embodiments and the modifications described above.

What is claimed is:

1. A detection device comprising:
    a sensor circuit comprising
        a plurality of sensor electrodes provided to a substrate,
        a peripheral electrode provided around a detection region provided with the sensor electrodes, and
        a shield electrode provided to a surface opposite to a surface provided with the sensor electrodes and the peripheral electrode;
    an AFE circuit configured to generate sensing data corresponding to a distance between the sensor electrodes and a proximity object, based on a detection signal acquired from the sensor electrodes;
    a drive signal generation circuit configured to generate a drive signal with a substantially sinusoidal waveform and supply the drive signal to the peripheral electrode and the shield electrode; and
    a control circuit configured to control the AFE circuit and the drive signal generation circuit, wherein
    the control circuit controls an amplitude value of the drive signal based on the sensing data.

2. The detection device according to claim 1, wherein
    the control circuit controls the amplitude value of the drive signal to be a first amplitude value when a maximum value of the sensing data of the sensor electrodes is smaller than a predetermined threshold, and
    the control circuit controls the amplitude value of the drive signal to be a second amplitude value smaller than the first amplitude value when the maximum value of the sensing data of the sensor electrodes is equal to or larger than the threshold.

3. The detection device according to claim 2, wherein the drive signal generation circuit comprises:
    an active filter circuit configured to filter a square wave signal that is output from the AFE circuit to generate a sinusoidal signal; and
    an amplifier circuit configured to amplify the sinusoidal signal to generate the drive signal, and
    the control circuit controls an amplification factor of the amplifier circuit based on the sensing data.

4. The detection device according to claim 3, wherein the amplifier circuit comprises a digital potentiometer electrical resistance of which is allowed to be adjusted, and the control circuit controls the electrical resistance of the digital potentiometer based on the sensing data.

5. The detection device according to claim 4, wherein the control circuit is capable of setting a fundamental frequency of the square wave signal and controls the electrical resistance of the digital potentiometer based on the fundamental frequency of the square wave signal.

6. The detection device according to claim 5, wherein the digital potentiometer is coupled in series to an input path of the amplifier circuit.

7. The detection device according to claim 6, wherein
    the control circuit sets the electrical resistance of the digital potentiometer to be relatively smaller as the fundamental frequency of the square wave signal is higher, and
    the control circuit sets the electrical resistance of the digital potentiometer to be relatively larger as the fundamental frequency of the square wave signal is lower.

8. The detection device according to claim 3, comprising:
    a first isolator provided to a signal transmission path between the AFE circuit and the control circuit; and
    a second isolator provided to a transmission path for the square wave signal between the AFE circuit and the drive signal generation circuit.

9. The detection device according to claim 8, wherein the first isolator is a digital isolator using a magnetic isolation technology.

10. The detection device according to claim 8, wherein the first isolator is an isolator in which a first photocoupler configured to transmit a signal from the control circuit to the AFE circuit and a photocoupler configured to transmit a signal from the AFE circuit to the control circuit are coupled in parallel.

11. The detection device according to claim 8, wherein the second isolator is a photocoupler.

12. The detection device according to claim 8, wherein
    the control circuit operates with a first reference potential as a ground potential, the second reference potential being a fixed potential,
    the AFE circuit operates with a second reference potential as a ground potential, and the second reference potential corresponds to a periodic signal that changes in potential periodically, and
    the drive signal generation circuit operates with the first reference potential as a ground potential and supplies the drive signal to the AFE circuit as the second reference potential.

13. The detection device according to claim 1, wherein
    the control circuit operates with a first reference potential as a ground potential, the first reference potential being a fixed potential,
    the AFE circuit operates with a second reference potential as a ground potential, and the second reference potential corresponds to a periodic signal that changes in potential periodically, and
    the drive signal generation circuit operates with the first reference potential as a ground potential and supplies the drive signal to the AFE circuit as the second reference potential.

14. The detection device according to claim 1, wherein
    the sensor circuit configured to detect an object to be detected in proximity to a detection surface that is the surface provided with the sensor electrodes and the peripheral electrode,
    the sensor circuit has a first detection mode for detecting a position of the object to be detected when the object to be detected is not in contact with the detection surface and a second detection mode for detecting a position of the object to be detected when the object to be detected is in contact with the detection surface, the control circuit sets a detection mode of the sensor circuit to the first detection mode when the sensing data is equal to or larger than a predetermined threshold, and the control circuit sets the detection mode of the sensor circuit to the second detection mode when the sensing data is smaller than the predetermined threshold.

15. The detection device according to claim 14, wherein the AFE circuit operates as an integrating circuit in which a negative feedback capacitance is coupled between a non-inverting input terminal and an output terminal of a differential amplifier circuit, the control circuit controls the negative feedback capacitance to be relatively small in the first detection mode, and the control circuit controls the negative feedback capacitance to be relatively large in the second detection mode.

* * * * *